United States Patent [19]

Dietrich et al.

[11] Patent Number: 4,805,101
[45] Date of Patent: Feb. 14, 1989

[54] METHOD FOR ADJUSTING THE DAMPING FORCE IN MOTOR VEHICLES IN DEPENDENCE ON OUTPUT SIGNALS OF AN ACCELERATION TRANSMITTER

[75] Inventors: Christian Dietrich, Wessling; Dieter Hennecke, Reichertshausen; Simon Lösch, Wartenburg; Dirk Pfeil, Munich, all of Fed. Rep. of Germany

[73] Assignee: Bayerische Motoren Werke A.G., Munich, Fed. Rep. of Germany

[21] Appl. No.: 100,894

[22] Filed: Sep. 25, 1987

[30] Foreign Application Priority Data

Sep. 27, 1986 [DE] Fed. Rep. of Germany ....... 3632919

[51] Int. Cl.4 .............................................. B60G 11/26
[52] U.S. Cl. ................................. 364/424.01; 280/707
[58] Field of Search .................. 364/424; 280/688, 707

[56] References Cited

U.S. PATENT DOCUMENTS 4,693,494 9/1987 Buma et al. ..................... 364/424 X
4,700,971 10/1987 Doi et al. ......................... 364/424 X Primary Examiner—Eugene R. LaRoche
Assistant Examiner—David Mis
Attorney, Agent, or Firm—Barnes & Thornburg

[57] ABSTRACT

A method for the damping force adjustment of motor vehicles in dependence on output signals of an acceleration transmitter connected with the vehicle body which are prepared and compared with a predetermined threshold value and which trigger a signal for changing the damping, respectively, spring force when exceeding, respectively, falling below the threshold value. An output signal of an acceleration transmitter rigidly connected with the vehicle body is slidingly determined over a first and a second measuring period, the difference of the two average values are subtracted from one another and are compared with the threshold value. The measuring periods are thereby larger, respectively, smaller than the natural period (reciprocal natural frequency) of the vehicle body.

7 Claims, 2 Drawing Sheets

INFLUENCING MAGNITUDES FOR SHIFTING THRESHOLD VALUES

METHOD FOR ADJUSTING THE DAMPING FORCE IN MOTOR VEHICLES IN DEPENDENCE ON OUTPUT SIGNALS OF AN ACCELERATION TRANSMITTER

BACKGROUND AND SUMMARY OF THE INVENTION

The present invention relates to a method for the damping force adjustment of motor vehicles in dependence on output signals of a transmitter or pick-up arranged at the vehicle body, which are processed and trigger a signal for changing the damping force when exceeding or dropping below a predetermined threshold value.

In a known method of this type (EP No. 151 412-A) the output signals of the transmitter or pick-up constructed as magnitude, respectively, acceleration transmitter or pick-up are subjected to a frequency analysis. A damping force adjustment is then undertaken when the preferred low-frequency component of this output signal which is representative for the vibrations or oscillations of the vehicle body, exceeds a predetermined threshold value.

With the use of an acceleration transmitter or pick-up, the latter is arranged between a bearing plate for a damping- and spring-part and the end of the damping part, whereby the bearing plate in its turn is elastically supported with respect to the vehicle body. With such an arrangement of the acceleration transmitter, the latter receives preferredly the higher frequency component of the occurring vibration or oscillation frequencies typical for the vibrations or oscillations of the vehicle wheel, whereas the low frequency component then possesses a considerably smaller magnitude than the high frequency component. Added thereto is the influence of the output signal of the acceleration transmitter owing to the alternate action between the spring- and the damping-part with the acceleration transmitter itself. The adjustment of the damping force, in its turn, is undertaken in dependence on the portion of the low frequency vibration or oscillation component measured with respect to its amplitude.

In the known method, a reproducible damper adjustment is not possible because, on the one hand, the low frequency vibration or oscillation component is relatively small and can be determined only with difficulty as a result of the arrangement of the acceleration transmitter in the manner described above. By the determination of the amplitude of this component, a more rapid reaction, as is required in particular during the occurrence of individual obstacles, is not readily possible.

The present invention is concerned with the task to provide a method of the aforementioned type which enables in a simple and reproducible manner an indication concerning the occurrence of individual obstacles and thus a rapid change of the spring-, respectively, damping-force of one or several wheels, respectively of one or several axles of the motor vehicle.

The underlying problems are solved according to the present invention in that average values formed from the output signals of a transmitter directly picking up the acceleration of the vehicle body are subtracted from one another and the numerical difference is compared with a threshold value, and in that the average values correspond to a first measuring period which is larger, respectively, to a second measuring period which is smaller than the natural period (reciprocal natural frequency) of the vehicle body.

A rapid reaction especially in case of individual obstacles becomes possible by the consideration of the changes of the output signals with respect to time. With the selection of the two measuring periods in the described form, the technical measurement expenditures can be kept small. Finally, the possibility is realized by taking into consideration the transmitter or pick-up signal in the manner described above to receive without costly frequency analysis only the low frequency component without significant impairment by the high frequency component and to evaluate the same correspondingly.

It is possible to operate with a predetermined threshold value. However, this represents in any case a compromise because significant influencing magnitudes on the output signal of the acceleration transmitter remain without consideration. It involves thereby the influences due to velocity, respectively, load of the vehicle, respectively, damper oil temperature in case of hydraulic dampers. By taking into consideration the load, respectively, the velocity, the fact is taken into account that at higher loads, respectively, higher velocities, a more rapid response is necessary. This is achieved by a corresponding reduction of the threshold value. By taking into consideration the damper oil temperature, it becomes possible to include the differing damping force adjustment caused by the differing temperature-dependent viscosity of the oil used in damping elements. This leads to the fact that at lower oil temperatures, the threshold value can be selected relatively high because, in this case, a harder damping force adjustment exists anyhow.

The determination of the average values can take place in different ways. One possibility consists in averaging the output signals of the transmitter over measuring periods which are larger, respectively, smaller than the natural period (reciprocal natural frequency) of the vehicle body. Another possibility resides in actualizing the already present average value with the assistance of the actual value. For that purpose the actual value is weighted. Different weighting factors are thereby necessary for the two average values. The relationship of the two weighting factors for the average values is reciprocal to the relationship of the determinative measuring periods for the averaging methods indicated above.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein.

DETAILED DESCRIPTION OF THE DRAWINGS

Figure 1:
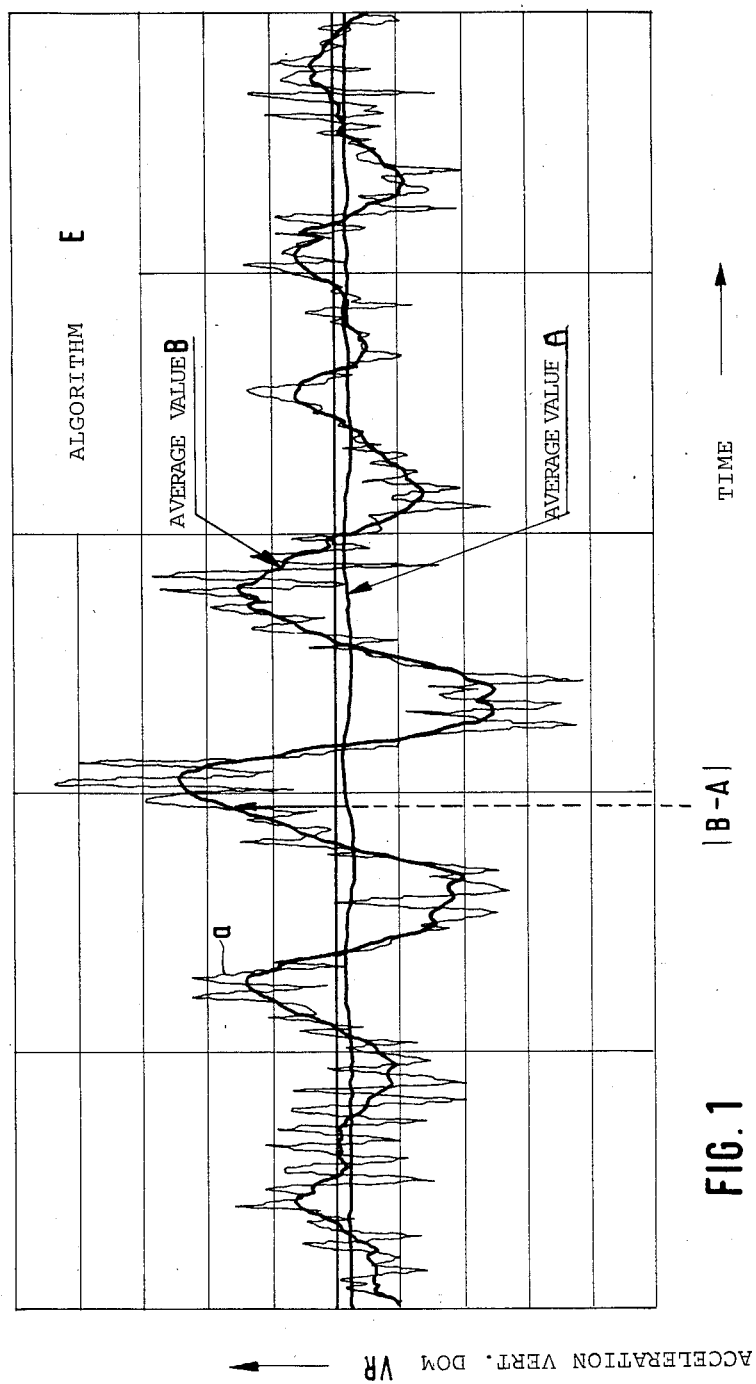
FIG. 1 is a diagram of the output signal of an acceleration transmitter plotted against time.

The operation of the present invention will be explained by reference to the drawing.

The diagram of FIG. 1 illustrates the output signal a of an acceleration transmitter or pick-up which is connected with a housing part fixed with the vehicle body.

This output signal clearly indicates a low-frequency component A and a high-frequency component (A-a). The high-frequency component is essentially caused by the vibrations or oscillations of the vehicle wheel whereas the low-frequency component is caused by the vibrations or oscillations of the vehicle body. If an average value about the output signal of the acceleration transmitter is now determined, on the one hand, over a measuring period which is considerably greater than the natural period (=reciprocal resonance frequency) determinative for the vibrations or oscillations of the vehicle body, then the signal curve B extending approximately horizontally will result therefrom. If the (sliding) average value about the output signal of the acceleration transmitter is determined in addition thereto for a measuring period which is considerably smaller than the natural period, then the curve designated by A will result therefrom. The amount of the two values B minus A is an indication for the low-frequency vibration or oscillation component. If this difference exceeds a predetermined threshold value, then the damping force of one or several damping elements (not shown) and/or the spring force of a corresponding number of spring elements is adjusted in the direction "hard".

This difference B minus A lies as regards its numerical value above the threshold value already at a simple obstacle, at which a considerable vibration or oscillation of the vehicle body is excited, and has as a consequence a corresponding reaction of the damping, respectively, spring parts. It is possible therewith to drive in principle with a soft spring-, respectively, damper-adjustment because an effective reaction to individual obstacles is possible and therewith undesired effects on the driving safety or even damages at the vehicle body can be prevented.

From a circuit point of view, the present invention can be realized in the manner that the average values A and B formed by way of corresponding indicators are fed to a difference amplifier whose output signal is fed together with a threshold value to a further difference amplifier which, on the other hand, is acted upon with the threshold value. The output signal of this differential amplifier serves for the adjustment of the damping-, respectively, spring parts.

In lieu of the averaging method over differing measuring periods for the average values A and B, a corresponding averaging may also be carried out with the aid of a method in which the actual measured value x is provided with a weighting factor and leads to an actualization of the average value. This can take place, for example, with the aid of an algorithm:

$$\bar{x}_n = \frac{x_a + F \cdot x}{1 + F}$$

where $\bar{x}_n$ is the resulting new average value (A, respectively B), $\bar{x}_a$ is the pre-existing average value, and F is a a weighting factor.

The weighting factor F is different for the two average values A and B. The ratio of the two weighting factors for the average values A and B is reciprocal to the ratio of the measuring periods in the above method. This means the weighting factor for the output signal of the acceleration transmitter is considerably larger for the calculation of the average value B than the weighting factor for the calculation of the average value A.

Figure 2:
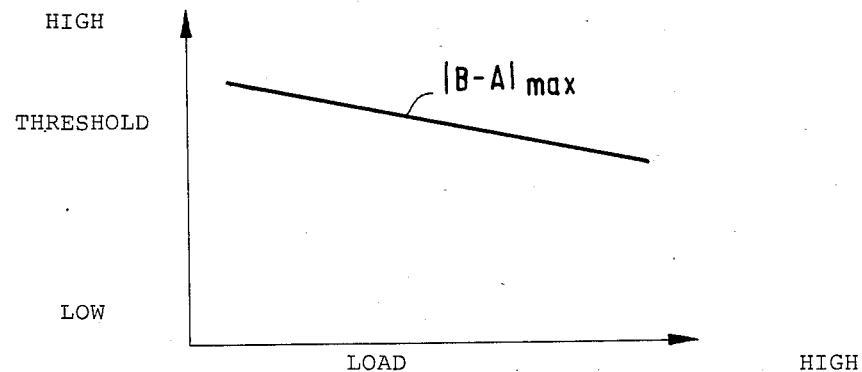
FIG. 2 are three diagrams indicating the influencing magnitudes for shifting threshold values.
Figure 2:
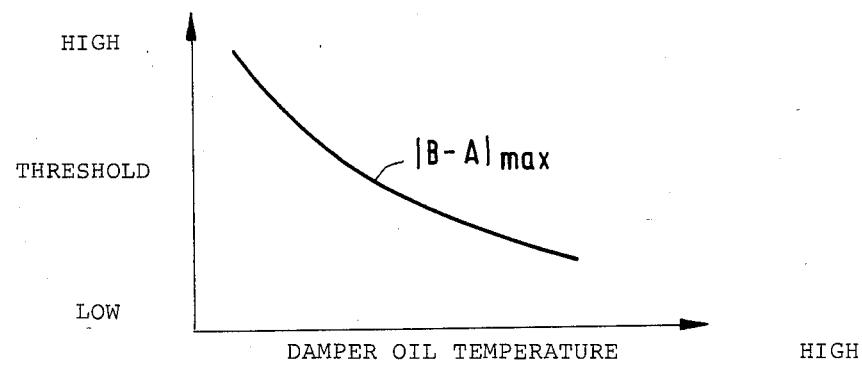
Figure 2:
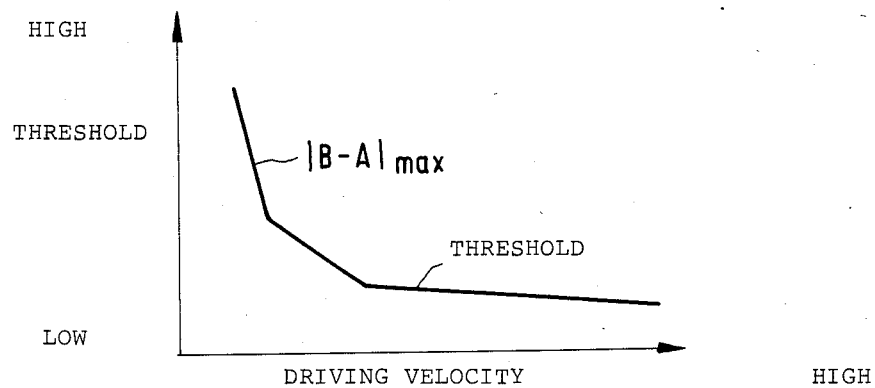

The threshold value $|A-B|_{max}$, with which the difference $|A-B|$ is compared may be dependent on the load, on the damping oil temperature and on the driving velocity. This dependency is indicated typically in the three diagrams of FIG. 2. It follows therefrom that at higher load, higher damper oil temperature or higher driving velocity, a lower threshold is determinative, i.e., in those cases a shifting to a harder damper, respectively, spring adjustment takes place at an earlier instant.

As the circuits necessary for carrying out the method in accordance with the present invention are known to those skilled in the art, involving commercially available components, a detailed description thereof is dispensed with herein for the sake of simplicity.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A method for adjusting the damping force of motor vehicles in dependence on output signals of a transmitter arranged at a vehicle body, which are processed and which trigger a signal for changing the damping force when exceeding or dropping below a predetermined threshold value, comprising the steps of subtracting from one another average values formed from the output signals of a transmitter directly picking up the accelerations of the vehicle body, and comparing the numerical difference with a threshold value whereby the average values correspond to a first measuring period which is larger, respectively, to a second measuring period which is smaller than the natural period (reciprocal natural frequency) of the vehicle body.

2. A method according to claim 1, wherein the threshold value is dependent on at least one of vehicle velocity, load of the vehicle and damping oil temperature in case of hydraulic dampers.

3. A method according to claim 2, wherein the average values are obtained by averaging over measuring periods which are larger, respectively, smaller than the natural period of the vehicle body.

4. A method according to claim 2, wherein the average values are determined with the assistance of weighted actual output signals of the transmitter whereby the ratio of the weighting factors for the average values is substantially reciprocal to the ratio of the determining measuring periods.

5. A method according to claim 1, wherein the average values are obtained by averaging over measuring periods which are larger, respectively, smaller than the natural period of the vehicle body.

6. A method according to claim 1, wherein the average values are determined with the assistance of weighted actual output signals of the transmitter whereby the ratio of the weighting factors for the average values is substantially reciprocal to the ratio of the determining measuring periods.

7. A method according to claim 1, wherein the threshold value is dependent on vehicle velocity, load of the vehicle and damping oil temperature in case of hydraulic dampers.

* * * * *